(12) United States Patent
Serdyukov et al.

(10) Patent No.: US 8,938,408 B1
(45) Date of Patent: Jan. 20, 2015

(54) SYSTEMS AND METHODS FOR CLASSIFICATION AND SEGMENTATION OF BROWSING LOGS BASED ON USER'S SEARCH GOALS

(71) Applicant: Yandex Europe AG, Lucerne (CH)

(72) Inventors: Pavel Viktorovich Serdyukov, Moscow (RU); Yury Mikhailovich Ustinovskiy, Moscow (RU)

(73) Assignee: Yandex Europe AG, Lucerne (CH)

( * ) Notice: Subject to any disclaimer, the term of this patent is extended or adjusted under 35 U.S.C. 154(b) by 0 days.

(21) Appl. No.: 14/220,679

(22) Filed: Mar. 20, 2014

(51) Int. Cl.
*G06F 15/18* (2006.01)
*G06F 17/30* (2006.01)
*G06N 99/00* (2010.01)

(52) U.S. Cl.
CPC .... *G06F 17/30867* (2013.01); *G06F 17/30598* (2013.01); *G06N 99/005* (2013.01)
USPC .............. 706/12; 707/731; 707/738; 707/751

(58) Field of Classification Search
CPC ..................... G06F 17/30867; G06F 17/30589
USPC .......................................... 707/731, 738, 751
See application file for complete search history.

(56) References Cited

U.S. PATENT DOCUMENTS

2011/0208730 A1 * 8/2011 Jiang et al. ..................... 707/727
2011/0258148 A1 * 10/2011 Gao et al. ......................... 706/12

OTHER PUBLICATIONS

Jones, Rosie et al.; "Beyond the Session Timeout: Automatic Hierarchical Segmentation of Search Topics in Query Logs"; 2008; CIKM '08; pp. 699-708.*
Kustarev, Andrey et al.; "Session-based Query Performance Prediction"; 2012; CIKM '12; pp. 2563-2566.*
Ustinovskiy, Yury et al.; "Intent-Based Browse Activity Segmentation"; 2013; Springer-Verlag; pp. 242-253.*

* cited by examiner

*Primary Examiner* — Stanley K Hill
(74) *Attorney, Agent, or Firm* — Arent Fox LLP; Michael Fainberg

(57) ABSTRACT

Disclosed are systems, methods and computer program products for classification and segmentation of user's browsing logs based on search goals of the user. In one aspect, the method includes receiving a browsing log of a user; extracting web page features from the browsing log; generating web page classifiers based on the extracted features of the browsing log, wherein different classifiers are related to different search goals of the user; segmenting the browsing log using the one or more classifiers into a plurality of separate logical browsing sessions related to different search goals of the user; and performing an Internet search based on a search query of the user and information about one of the logical browsing sessions.

30 Claims, 3 Drawing Sheets

SYSTEMS AND METHODS FOR CLASSIFICATION AND SEGMENTATION OF BROWSING LOGS BASED ON USER'S SEARCH GOALS

TECHNICAL FIELD

The disclosure relates generally to the field of Internet search, and more specifically to systems, methods and computer program products for classification and segmentation of user's browsing logs based on search goals of the user.

BACKGROUND

The Internet and the World Wide Web have experienced tremendous growth in the past two decades with millions of new websites being added every year. The downside of this is that it becomes harder and harder for Internet users to find relevant information on the Web. Internet search engines server an important function of helping users to find information on the Web. A typical search engine operates as follows: it use a Web crawler to collected information about websites on the Internet and identify keywords (i.e., words of relative importance) occurring in titles, subtitles, meta tags and other sections of Web pages. The search engine then creates and constantly updates an index of all identified Web pages and the keywords occurring therein. Generally, the Web pages are organized in the index based on popularity or frequency of their access by users. Finally, when a user access the search engine via a Web browser and enters a search query, the search engine searches the index and displays to the user a list of Web pages that contain the words that match the user's query.

Some search engines store users' Web browsing history in a browsing log. Typically, a browsing log includes a list of Web page addresses (e.g., Uniform Resource Locators (URLs)) visited by a user during one or more browsing sessions and related metadata, such as the Web page titles and the date and time the Web page was viewed by the user. For example, the browsing log may be stored locally by the Web browser application in a memory or storage of the user's computer. Alternatively, the browsing log may be stored on the search engine servers. Analysis of browsing logs may provide diverse and valuable information about users' interests and search goals. This information may be used by the search engine to improve accuracy of the search results during subsequent Web searches by the user, improve accuracy of targeted advertisements displayed by the Web browser to the users along with the search results, and other purposes. Therefore, there is a need for an effective mechanism for analyzing browsing logs to determine the intent or goals of Web searches of users.

SUMMARY

Disclosed are systems, methods and computer program products for classification and segmentation of user's browsing logs based on search goals of the user. In one aspect, an example method includes receiving at least a portion of browsing log of a user, the browsing log comprising at least a plurality of web pages viewed by the user; extracting one or more web page features from the browsing log, wherein the features include at least web address features of the web pages viewed by the user; generating by one or more web page classifiers based on the extracted features of the browsing log, wherein different classifiers are related to different search goals of the user, and wherein generating the one or more classifiers includes performing a pairwise classification of at least web address features of the browsing log; segmenting the browsing log using the one or more classifiers into a plurality of separate logical browsing sessions related to different search goals of the user, wherein segmenting the browsing log includes analyzing at least one or more pairs of web pages viewed by the user and determining a probability of whether each of the web address features in each pair relate to a same or different search goal of the user; and performing an Internet search based at least in part on a search query of the user and information about one of the logical browsing sessions.

In one aspect, receiving at least a portion of browsing log of a user further includes segmenting the browsing log by generating a partition of at least the Web address features and grouping the Web address features based on one or more search goals of the user.

In another aspect, the pairwise classification may include generating a learning set of classifiers based on the pairs of web address features. In another example aspect, the learning set of classifiers may be generated by assigning a label to at least each of the extracted web address features; assigning a value of 1 to the pairs of web address features relating to a similar or same search goal and assigning a value of 0 to all other pairs of the web address features; and training the learning set of classifiers using at least the extracted web address features. In one aspect, the labels may be indicative of context between adjacent web address features in the segmented browsing log. In one aspect, the training the learning set of classifiers includes using a gradient boosted decision tree with logistic loss function.

In one aspect, the web address features determine a similarity of URLs in the browsing log based on one or more of a cosine of distance between vectors made of trigrams, a length of longest common substring and ratios of lengths of each of the URLs to the length of longest common substring and a match of hosts.

In another aspect, the web page features may further include textual features that are generated by determining a similarity of text between search queries or between the web pages visited based on one or more of a cosine of distance between term vectors of titles and a ratio of common words to lengths of each page.

In another aspect, the web page features may further include temporal features, that are generated by determining a time difference between time stamps of a pair of visited web pages and determining a number of pages visited between the opening of each page.

In another aspect, the web page features may include one or more of: a time difference between each of the web pages visited by the user, a length of a longest common substring (LCS) of a URL, a ratio of the LCS to a first one of a plurality of URLs, a ratio of the LCS to a second one of the plurality of URLs, a number of web pages visited by the user between each web page in a pair of web pages, a trigram match of URLs, a context of a ratio of the LCS to a length of one of the plurality of URLs, a context of a ratio of the LCS to a length of a second one of the plurality of URLs, a URL host, and a context of the LCS.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for classification and segmentation of user's browsing logs based on search intent or goals of the user. The terms "intent" and "goal" will be used interchangeably herein. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

In one aspect, the systems and methods for classification and segmentation of user's browsing logs based on search goals of the user may be used to improve the operation of a search engine in generating search results that are relevant not only to the specific search query, but also to a broader intent or goal of the user. In addition, the disclosed systems and methods may be used for providing personalization of search results based on user's search goals, search query reformulations based on user's intent, integration of popular browsing trails into the search engine results, smoothing and generalization of click data through a query-flow-graph, session-oriented evaluation of search engine performance, improving the accuracy of targeted advertisements and improving accuracy in the modeling of a user's behavior. Those of skill in the art will appreciate other uses and benefits of the present invention.

In two key aspects, the system and methods of the present invention provide: 1) extraction of data from raw browsing logs; and 2) segmentation of browsing logs including both query and Web address information (e.g., Uniform Resource Locator (URL)). With respect to the first aspect, it is important to understand the interaction nature of a user with a browser during a search session. It is helpful to demarcate and identify different browsing sessions within browsing logs and then analyze the browsing log sessions separately. Such sessions are also referred to herein as browsing trails. Segmentation of browsing log enables evaluation of how the information need of a user drifts after a query, why the user reformulates a query, and common changes or shifts in user's search goals. In addition, the intent-based segmentation of the browsing logs helps to determine a shift of the information need of a user on the browsed webpage navigational level instead of at the coarse-grained search engine results page level.

Figure 1:
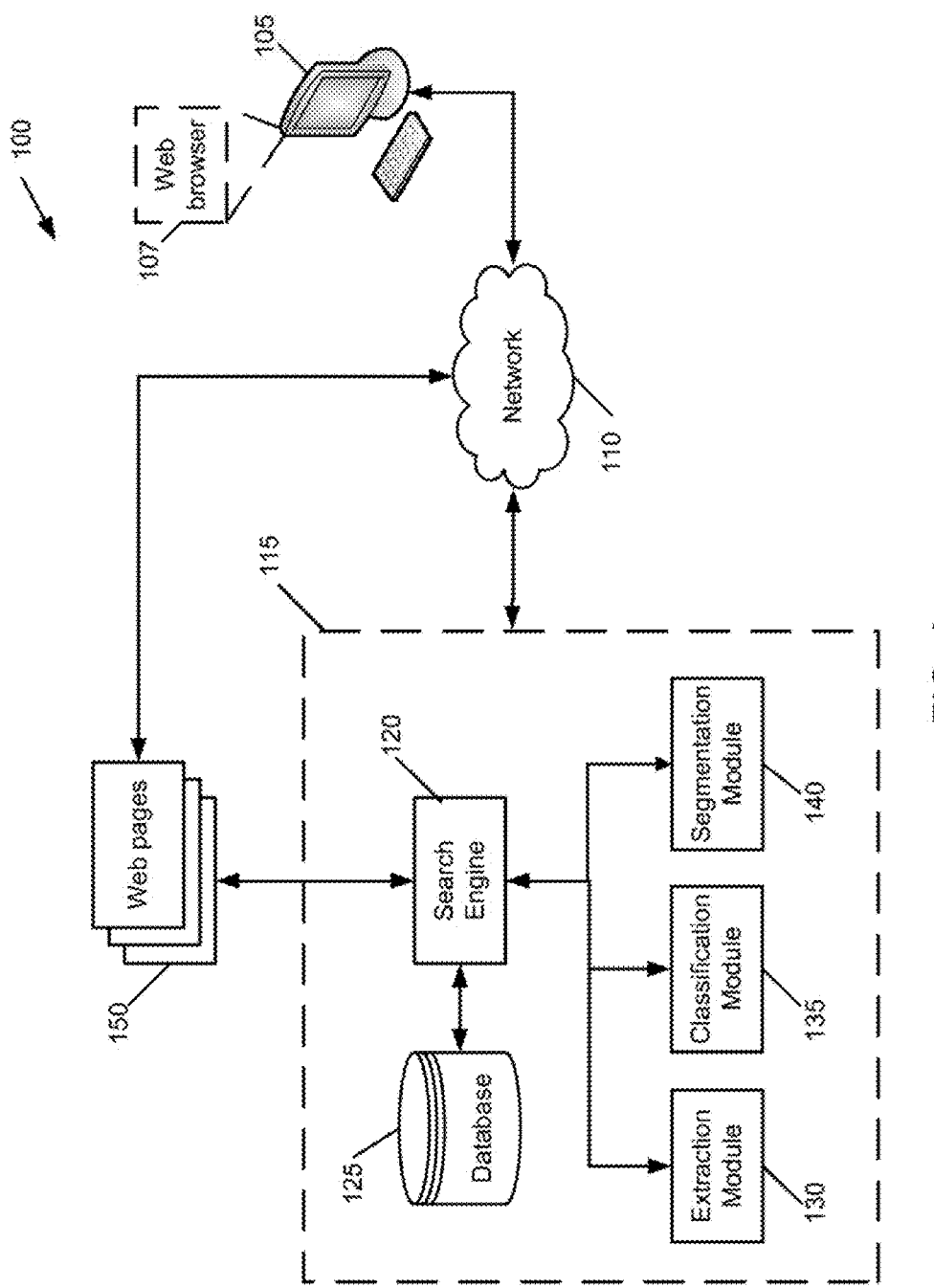
FIG. 1 is a diagram illustrating an example configuration of a system for intent-based classification and segmentation of browsing logs according to one aspect of the invention.

FIG. 1 is an example configuration of a system for intent-based classification and segmentation of user's browsing logs according to aspects of the present invention. As shown, system 100 includes a user device 105 such as a personal computer (PC), a thin-client computer, a notebook computer, a tablet, a smart phone or any other type of computing device. In one aspect, the user device 105 is connected to the network 110, such as the Internet, and operable to run a Web browser 107 that allow the user of the device 105 to view Internet content, such as Web pages 250. In one aspect, the Web browser 107 may be implemented as a software application stored in a memory of the user device 105.

In one aspect, the user device 105 is in communication via the network 110 with a Web server 115 that hosts an Internet search engine 120. Such communication, as used herein throughout, may be through any known means, such as wireless or wired LANs, WANs, etc. The search engine 120 is operable to receive user search queries from the user device 105 provided via the user interface of the Web browser 107 and to search the Internet for Web pages 150 that match user's search query. In one aspect, the server 115 further includes a database 125 that stores data used by the search engine 120, such as Web page indexes, user browsing logs, search results and other search-related data. In another aspect, user browsing logs may be stored locally by the Web browser 107 in a memory or storage of the user device 105.

In various aspects, the search engine 120 may be in communication with or include therein an extraction module 130, a classification module 135 and a segmentation module 140. The terms "engine" and "module" as used herein refer to real-world devices, apparatuses, or systems implemented using hardware, such as by an application specific integrated circuit (ASIC) or field-programmable gate array (FPGA), for example, or as a combination of hardware and software, such as by a microprocessor system and a set of instructions to implement the engine's or module's functionality, which (while being executed) transform the microprocessor system into a special-purpose device. An engine and a module can also be implemented as a combination of the two, with certain functions facilitated by hardware alone, and other functions facilitated by a combination of hardware and software. In certain implementations, at least a portion, and in some cases, all, of an engine or a module can be executed on the processor of a general purpose computer (such as the one described in greater detail in FIG. 3 below). Accordingly, the search engine 120 and modules 130, 135 and 140 can be realized in a variety of suitable configurations, and should not be limited to any particular implementation.

In one example aspect, the extraction module 130 is operable to receive user's raw browsing log from the database 125 or from the user device 105. The raw browsing log may include, but is not limited to, user search queries, URLs of web pages viewed by a user during one or more browsing session, time stamps relating to when a site was visited, durations of each visit to each web site, URLs visited as a result of clicks within a web site and other web browsing information. The extraction module 130 is further operable to identify different browsing trails (also referred herein as logical browsing sessions) and various web pages features from the browsing log. Logical browsing sessions includes a plurality of web pages that are related to a particular search goal of a user. The extracted features may include, but are not limited to, web address features (e.g., URLs), textual features (e.g., keywords) and temporal features (e.g., date/time information) of the web pages from the browsing log of the user.

In one example aspect, the classification module 135 is operable to generate one or more classifiers using the features extracted by the extraction module 130. As will be described in more detail, the one or more classifiers may be generated using a method of pairwise classification of the extracted features. Generally, the pairwise classification includes generating a learning set of classifiers based on pairs of the extracted features.

In one example aspect, the segmentation module 140 is operable to use the generated classifiers to analyze one or more pairs of the features as will be described in further detail below. The segmentation module 140 is further operable to determine a probability of whether the features in each pair are related to the same or different search goal of the user.

Figure 2:
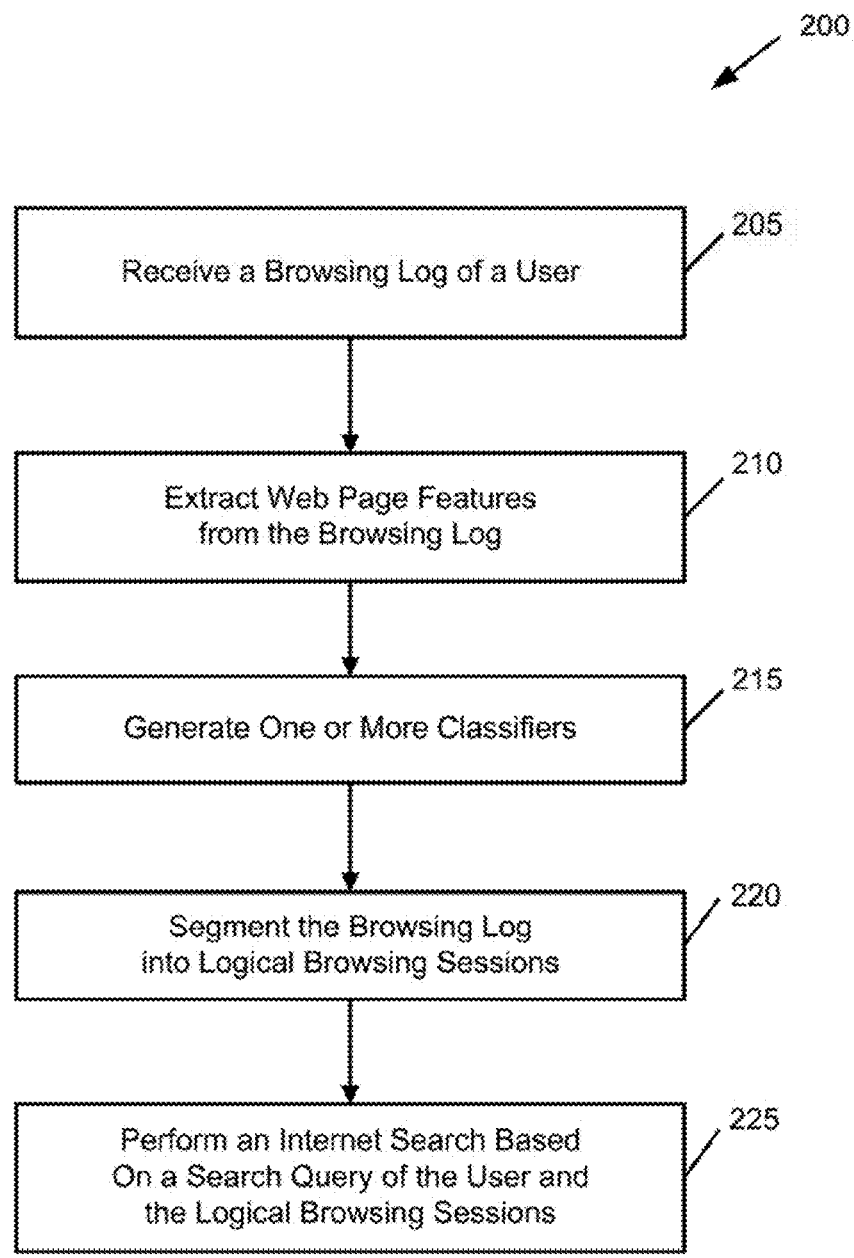
FIG. 2 is a flow diagram illustrating an example method for intent-based classification and segmentation of browsing logs according to one aspect of the invention.

FIG. 2 illustrates an example of a method for intent-based classification and segmentation of user's browsing logs according to aspects of the present invention. The method 200 may be better understood with the help of the following definitions.

Browsing log may be defined as $D_u = \{d_1, \ldots, d_N\}$, and may record periodic (e.g., daily) activity of a user u in the Web browser. The browsing log includes, but is not limited to, URLs of viewed pages, queries submitted to a search engine, links followed by a user, and timestamps of actions. Each $d_i$ is a document viewed by a user with the available information: e.g., URL of $d_i$, time of URL visit, text of the $d_i$ (which may be obtained at a later time).

Logical browsing session (or simply logical session) may be defined as $D_u^g = \{d_{i1}, \ldots, d_{iK}\}$, and may include a subset of the raw browsing log that consists of intent-related pages, i.e. pages visited with the same or similar search goal g.

Query log may be defined as $Q_u = \{q_1, \ldots, q_n\}$, and my include a sequence of a user's search queries. Any query $q_i$ corresponds to some record $d_i$ in the browsing log.

Logical query session may be defined as $Q_u^g = \{q_{i1}, \ldots, q_{ik}\}$, and may include a subset of search queries that are unified into one search goal (i.e., intent) g of the user.

A set of intent-related web pages visited by the user may be expressed as:

$$D_u = \Pi_g D_u^g \quad (1)$$

where g ranges over all goals of a user during a logical browsing session. The search goals may implicit in this decomposition—they are represented only by the collection of underlying pages, not by any specific label.

A set of intent-related queries may be expressed as a subset of $D_u$ as follows:

$$Q_u = \Pi_g Q_u^g \quad (2)$$

where g ranges over all goals of a user during a logical query session.

At step 205, the method 200 includes retrieving or receiving a user's raw browsing log $D_u$ from a database of a search engine 120 or from the Web browser of the user device 105. The raw browsing log $D_u$ may include a plurality of web pages $d_i$ returned by the search engine 120 based on one or more search queries $q_i$ of the user made through the Web browser 107. The user's input query is indicative of a search goal of the user, that is, the results the user is hoping and/or expects to receive from the search engine 120 based on the user's search query.

At step 210, the method 200 includes extracting various web pages features from the browsing log $D_u$ and storing the features in a database 125 on the server 115. In one aspect, the extraction module 130 of system 100 is operable to extract at least three types of web page features: Web address features, textual features and temporal features.

Web address features measure similarity of URLs $u_1$, $u_2$ of pages $d_1$ and $d_2$. Examples of these features are cosine distance between vectors made of trigrams of $u_1$ and $u_2$, length of the longest common substring and its ratios to the lengths of URLs, match of hosts of $u_1$ and $u_2$.

Textual features measure similarity of text $t_1$, $t_2$ of pages $d_1$ and $d_2$. Examples of these features are cosine distance between term vectors of titles $t_1$ and $t_2$, ratios of tf.idf of common words to the lengths of each page, the same for top words (e.g., 10) with the highest tf.idf score.

Temporal features measure time difference between moments when pages $d_1$ and $d_2$ were opened in the Web browser, number of pages visited between $d_1$ and $d_2$. Historical information about co-occurrence of pairs of documents in one browsing session may not be accounted for because such information is very sparse, that is, two URL's visited sequentially by one user are not likely to be visited by a significant number of other users.

At step 215, the method 200 includes generating, based on the browsing log and the extracted web page features one or more classifiers that determine whether two entries in the browsing log relate the same or different user goals. In one aspect, the classification module 135 of system 100 may generate and train one or more classifiers using a method of pairwise classification of the extracted web page features. To train a classifier, a learning set of classifiers is first created by taking a collection of pairs $(d_1, d_2)$ of Web pages visited by the user and assigning labels $l(d_1, d_2, D_u) \in \{0, 1\}$ choosing 1 if pages in a pair belong to the same logical browsing session and 0 otherwise. The classifier may be trained on a set F of features $\{f_i(d_1, d_2, D_u)\}_{i=1}^F$ extracted from the raw browsing log. Note that the labels as well as the features depend on both pages $d_1$, $d_2$ themselves and the data extracted from the raw browsing log, in particular, labels are assigned relying on the context (adjacent pages) of $d_1$ and $d_2$. This simplifies the labeling process and allows implementation of contextual features.

Using the learning set of classifiers, the classier may be trained using, for example, Gradient Boosted Decision Trees (GBDT) with logistic loss function. During learning process, the module 135 may assign a probability $p(d_1, d_2, D_u)$ of getting the label 1 to each sample and maximizes the probability of correct classification of all samples. As a result, the classifier is generated, which includes may be expressed as a function of $p(d_1, d_2, D_u)$. The variable $D_u$ may be omitted in the classifier function. The classifier $p(\bullet)$ takes features of pages $d_1$ and $d_2$ and computes the probability that the pages belong to the same logical browsing session.

At step 220, the method 200 includes segmenting the browsing log $D_u$ into separate logical sessions $D_u^g$ related to different search goals g of the user. In one aspect, the segmentation module 140 of system 100 may use the generated classifier to segment the browsing log of a user into different logical sessions related to different search goals of the user. Generally, the segmentation of the browsing log includes determining a probability of whether the features in each pair of web pages relate to a same search goal. For example, given the browsing log of one user $D_u$ the classifier may be run for all pairs of pages $d_{i1}$, $d_{i2}$, such that $d_{i1}$ precedes $d_{i2}$ in $D_u$, so all of the probabilities $p(d_i, d_j)$, $\tau(d_i) < \tau(d)$ are determined.

In one aspect, a segmentation (1) may be determined by maximizing the joint probability function:

$$P = \Pi' p(d_i, d_j) \Pi''(1 - p(d_i, d_j)) \quad (3a)$$

or equivalently the sum of logarithms of odds function:

$$\Phi = \sum' \log\frac{p(d_i, d_j)}{1 - p(d_i, d_j)} \quad (3b)$$

The terms Π' and Σ' may run over all pairs of pages visited with the same intent and Σ'' may run over all pairs visited with different intents. While the exact solution of this optimization problem is NP-hard, several efficient algorithms can be applied to approach. In one aspect, some of these algorithms may work iteratively. They may run online and model the labeling process. More specifically, at every moment of time T it is assumed that the current browsing log $D_u(T)=\{d|\tau(d)<T\}$ is already segmented $D_u(T)=\Pi_g D_u^g$ and it is determined what to do with the next n-th page $d_n$. In one aspect, the present invention includes two approaches: 1) append $d_n$ to one of the existing logical sessions $D_u^g$, or 2) begin the new logical session $D_u^{gG}$ with $d_n$. To choose between these approaches, one of the following heuristics may be used. The advantage of such approaches is the opportunity to use them as a part of online services with demands for real-time data processing.

1. Last page maximal likelihood. The last document $d_g \in D_u^g$ is considered for each current search goal g. The page $d_n$ is appended to the logical session $D_u^g$, where g=argmax $p(d_g, d_n)$ if and only if $p(d_g, d_n) > \frac{1}{2}$, otherwise a new session is started.

2. All pages maximal likelihood. All previous documents $d_i$ are considered. For the new page $d_n$, a $d_i$ is found that maximizes a probability $p(d_g, d_n)$ and a $d_n$ is appended to the logical session of $d_i$, if $p(d_i, d_n) > \frac{1}{2}$, otherwise a new session is started.

3. Greedy appending. A logical session is chosen for document $d_n$ that maximizes the sum of logarithms of odds (3b). A new session is started, if for all current goals g the sum $$\Phi(g) := \sum_{d_i \in D_u^g} \log\frac{p(d_i, d_n)}{1 - p(d_i, d_n)}$$

is negative, otherwise $d_n$ is appended to the $D_u^g$ with a maximal sum of log-odds. This approach is the best solution to log-odds optimization under natural constraints because 1) it provides segmenting at each moment during the current browsing logical session, and 2) does not permute documents/sites in the detected segments, once they have been assigned to a segment. An offline greedy algorithm, which works with the whole daily browsing log, may also be used.

4. Greedy merging. Each page is attached to a separate logical browsing session, then iteratively a pair of sessions are greedy glued until the sum of log-odds (3b) is increased.

Each of these approaches has its advantages and disadvantages. For example, the advantage of the last page maximal likelihood approach is its efficiency—at each step G probabilities are computed, where G is the number of current goals, so the classifier is run O(N·G) times. However, any outlier or broken record in the raw browsing log will cut short the browsing logical session. Reminder methods (e.g., greedy appending) require $O(N^2)$ runs of the classifier—because in general N>>G, such methods are less efficient, but are relatively effective. However, they do not have applicability online, because the whole browsing log is required to evaluate it. It may still be possible to utilize it for various offline applications of logical browsing sessions and it outperforms other methods.

At step 225, the method 200 includes providing the information about identified logical browsing sessions to the search engine 120. The search engine 120 may use this information along with future user's search queries to generate search results personalized based on the user's search goals. The search engine 120 may also use information about identified logical browsing sessions to reformulate the user's search queries, to integrate popular logical browsing sessions (i.e., browsing trails) into the search engine results page for display to the user, to smooth and generalize click data using a query-flow-graph, to generate a session-oriented evaluation of the search engine's performance, to provide modeling of the user's behavior, and to provide targeted advertisements based on user's interests.

Figure 3:
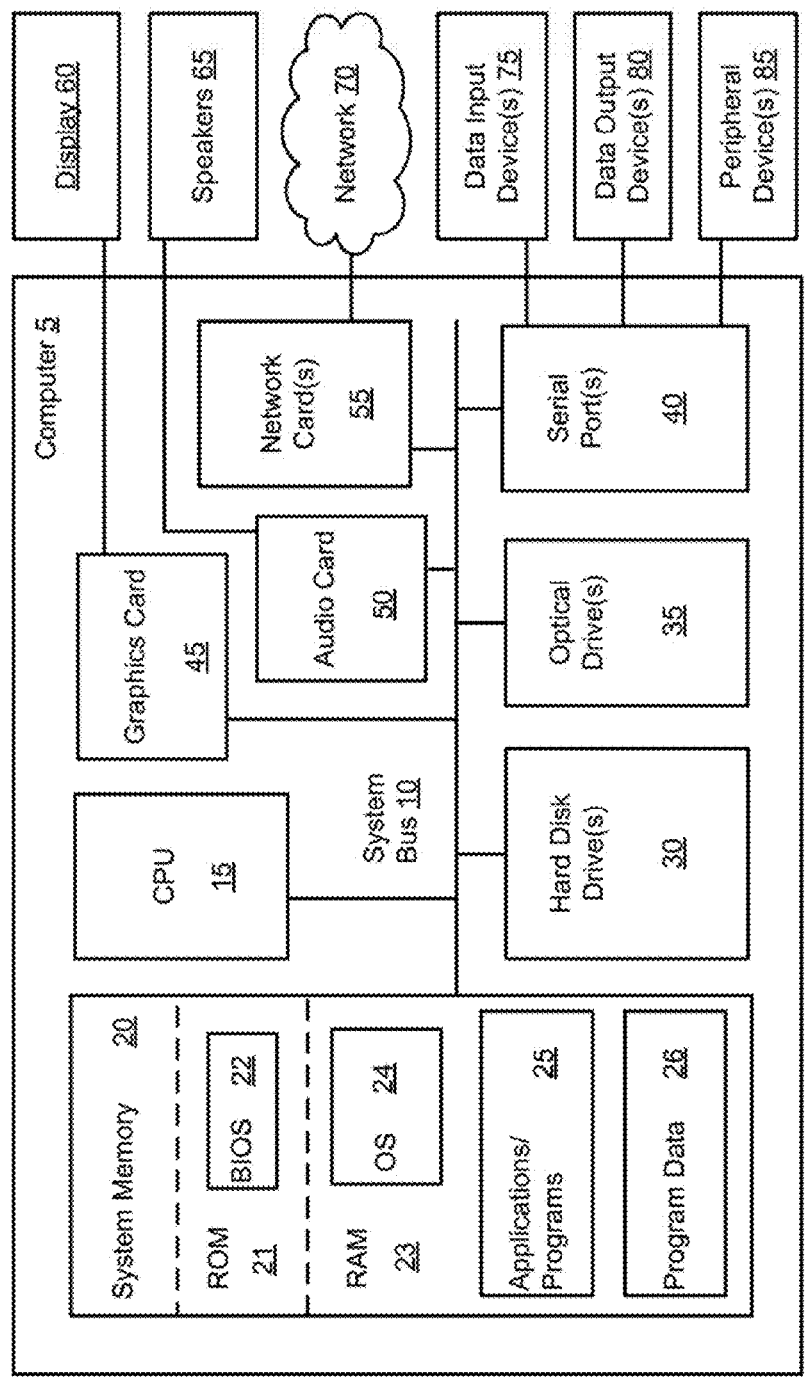
FIG. 3 is a diagram illustrating an example general-purpose computer system for implementing the systems and methods for intent-based classification and segmentation of browsing logs in accordance with aspects of the invention.

FIG. 3 depicts one example aspect of a computer system 5 that can be used to implement the disclosed systems and methods for intent-based classification and segmentation of browsing logs. The computer system 5 may include, but is not limited to, a PC, a notebook, tablet computer, a smart phone, a network server, a router, or other type of processing device. As shown, system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing search, the method comprising:
receiving, by a hardware processor, at least a portion of browsing log of a user, the browsing log comprising at least a plurality of web pages viewed by the user;
extracting one or more web page features from the browsing log, wherein the features include at least web address features of the web pages viewed by the user;
generating, by the hardware processor, one or more web page classifiers based on the extracted features of the browsing log, wherein different classifiers are related to different search goals of the user, and wherein generating the one or more classifiers includes performing a pairwise classification of at least web address features of the browsing log;
segmenting, by the hardware processor, the browsing log using the one or more classifiers into a plurality of separate logical browsing sessions related to different search goals of the user, wherein segmenting the browsing log includes analyzing at least one or more pairs of web pages viewed by the user and determining a probability of whether each of the web address features in each pair relate to a same or different search goal of the user; and
performing, by the hardware processor, an Internet search based at least in part on a search query of the user and information about one of the logical browsing sessions.

2. The method of claim 1, wherein the pairwise classification comprises:
generating a learning set of classifiers based on the pairs of Web address features.

3. The method of claim 2, wherein generating a learning set of classifiers comprises:
assigning a label to at least each of the extracted Web address features;
assigning a value of 1 to the pairs of Web address features relating to a similar or same search goal and assigning a value of 0 to all other pairs of the Web address features; and
training the learning set of classifiers using at least the extracted Web address features.

4. The method of claim 3, wherein the labels are indicative of context between adjacent Web address features in the segmented browsing log.

5. The method of claim 3, wherein training the learning set of classifiers comprises:
using a gradient boosted decision tree with logistic loss function.

6. The method of claim 1, wherein the web address features determine a similarity of URLs in the browsing log based on one or more of a cosine of distance between vectors made of trigrams, a length of longest common substring and ratios of lengths of each of the URLs to the length of longest common substring and a match of hosts.

7. The method of claim 1, wherein the features further include textual features that are generated by determining a similarity of text between search queries or between the web pages visited based on one or more of a cosine of distance between term vectors of titles and a ratio of common words to lengths of each page.

8. The method of claim 1, wherein the features further include temporal features, that are generated by determining a time difference between time stamps of a pair of visited web pages and determining a number of pages visited between the opening of each page.

9. The method of claim 1, wherein the features comprises one or more of: a time difference between each of the web pages visited by the user, a length of a longest common substring (LCS) of a URL, a ratio of the LCS to a first one of a plurality of URLs, a ratio of the LCS to a second one of the plurality of URLs, a number of web pages visited by the user between each web page in a pair of web pages, a trigram match of URLs, a context of a ratio of the LCS to a length of one of the plurality of URLs, a context of a ratio of the LCS to a length of a second one of the plurality of URLs, a URL host, and a context of the LCS.

10. The method of claim 1, wherein receiving at least a portion of browsing log of a user further includes: segmenting the browsing log by generating a partition of at least the Web address features and grouping the Web address features based on one or more search goals.

11. A system for performing search, the system comprising:
a processor configured to:

receive at least a portion of browsing log of a user, the browsing log comprising at least a plurality of web pages viewed by the user;

extract one or more web page features from the browsing log, wherein the features include at least web address features of the web pages viewed by the user;

generate one or more web page classifiers based on the extracted features of the browsing log, wherein different classifiers are related to different search goals of the user, and wherein generating the one or more classifiers includes performing a pairwise classification of at least web address features of the browsing log;

segment the browsing log using the one or more classifiers into a plurality of separate logical browsing sessions related to different search goals of the user, wherein segmenting the browsing log includes analyzing at least one or more pairs of web pages viewed by the user and determining a probability of whether each of the web address features in each pair relate to a same or different search goal of the user; and perform an Internet search based at least in part on a search query of the user and information about one of the logical browsing sessions.

12. The system of claim 11, wherein the pairwise classification comprises:
generating a learning set of classifiers based on the pairs of Web address features.

13. The system of claim 12, wherein generating a learning set of classifiers comprises:
assigning a label to at least each of the extracted Web address features;
assigning a value of 1 to the pairs of Web address features relating to a similar or same search goal and assigning a value of 0 to all other pairs of the Web address features; and
training the learning set of classifiers using at least the extracted Web address features.

14. The system of claim 13, wherein the labels are indicative of context between adjacent Web address features in the segmented browsing log.

15. The system of claim 13, wherein training the learning set of classifiers comprises:
using a gradient boosted decision tree with logistic loss function.

16. The system of claim 11, wherein the web address features determine a similarity of URLs in the browsing log based on one or more of a cosine of distance between vectors made of trigrams, a length of longest common substring and ratios of lengths of each of the URLs to the length of longest common substring and a match of hosts.

17. The system of claim 11, wherein the features further include textual features that are generated by determining a similarity of text between search queries or between the web pages visited based on one or more of a cosine of distance between term vectors of titles and a ratio of common words to lengths of each page.

18. The system of claim 11, wherein the features further include temporal features, that are generated by determining a time difference between time stamps of a pair of visited web pages and determining a number of pages visited between the opening of each page.

19. The system of claim 11, wherein the features comprises one or more of: a time difference between each of the web pages visited by the user, a length of a longest common substring (LCS) of a URL, a ratio of the LCS to a first one of a plurality of URLs, a ratio of the LCS to a second one of the plurality of URLs, a number of web pages visited by the user between each web page in a pair of web pages, a trigram match of URLs, a context of a ratio of the LCS to a length of one of the plurality of URLs, a context of a ratio of the LCS to a length of a second one of the plurality of URLs, a URL host, and a context of the LCS.

20. The system of claim 11, wherein receiving at least a portion of browsing log of a user further includes: segmenting the browsing log by generating a partition of at least the Web address features and grouping the Web address features based on one or more search goals.

21. A computer program product, stored on a non-transitory computer readable medium, for performing search, wherein the computer program product includes computer executable instructions for:
receiving at least a portion of browsing log of a user, the browsing log comprising at least a plurality of web pages viewed by the user;
extracting one or more web page features from the browsing log, wherein the features include at least web address features of the web pages viewed by the user;
generating one or more web page classifiers based on the extracted features of the browsing log, wherein different classifiers are related to different search goals of the user, and wherein generating the one or more classifiers includes performing a pairwise classification of at least web address features of the browsing log;
segmenting the browsing log using the one or more classifiers into a plurality of separate logical browsing sessions related to different search goals of the user, wherein segmenting the browsing log includes analyzing at least one or more pairs of web pages viewed by the user and determining a probability of whether each of the web address features in each pair relate to a same or different search goal of the user; and
performing, an Internet search based at least in part on a search query of the user and information about one of the logical browsing sessions.

22. The product of claim 21, wherein the pairwise classification comprises:
generating a learning set of classifiers based on the pairs of Web address features.

23. The product of claim 22, wherein generating a learning set of classifiers comprises:
assigning a label to at least each of the extracted Web address features;
assigning a value of 1 to the pairs of Web address features relating to a similar or same search goal and assigning a value of 0 to all other pairs of the Web address features; and
training the learning set of classifiers using at least the extracted Web address features.

24. The product of claim 23, wherein the labels are indicative of context between adjacent Web address features in the segmented browsing log.

25. The product of claim 23, wherein training the learning set of classifiers comprises:
using a gradient boosted decision tree with logistic loss function.

26. The product of claim 21, wherein the web address features determine a similarity of URLs in the browsing log based on one or more of a cosine of distance between vectors made of trigrams, a length of longest common substring and ratios of lengths of each of the URLs to the length of longest common substring and a match of hosts.

27. The product of claim 21, wherein the features further include textual features that are generated by determining a similarity of text between search queries or between the web pages visited based on one or more of a cosine of distance between term vectors of titles and a ratio of common words to lengths of each page.

28. The product of claim 21, wherein the features further include temporal features, that are generated by determining a time difference between time stamps of a pair of visited web pages and determining a number of pages visited between the opening of each page.

29. The product of claim 21, wherein the features comprises one or more of: a time difference between each of the web pages visited by the user, a length of a longest common substring (LCS) of a URL, a ratio of the LCS to a first one of a plurality of URLs, a ratio of the LCS to a second one of the plurality of URLs, a number of web pages visited by the user between each web page in a pair of web pages, a trigram match of URLs, a context of a ratio of the LCS to a length of one of the plurality of URLs, a context of a ratio of the LCS to a length of a second one of the plurality of URLs, a URL host, and a context of the LCS.

30. The product of claim 21, wherein receiving at least a portion of browsing log of a user further includes: segmenting the browsing log by generating a partition of at least the Web address features and grouping the Web address features based on one or more search goals.

* * * * *